United States Patent
Uehara

(10) Patent No.: US 6,805,980 B2
(45) Date of Patent: Oct. 19, 2004

(54) THIN PERMANENT-MAGNET FILM AND PROCESS FOR PRODUCING THE SAME

(75) Inventor: Minoru Uehara, Osaka (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 09/959,256

(22) PCT Filed: Feb. 21, 2001

(86) PCT No.: PCT/JP01/01276
§ 371 (c)(1),
(2), (4) Date: Oct. 22, 2001

(87) PCT Pub. No.: WO01/63628
PCT Pub. Date: Aug. 30, 2001

(65) Prior Publication Data
US 2002/0192502 A1 Dec. 19, 2002

(30) Foreign Application Priority Data
Feb. 22, 2000 (JP) .......... 2000-044175

(51) Int. Cl.⁷ .......... H01F 1/04; B32B 9/00; B05B 5/12
(52) U.S. Cl. .......... 428/693; 428/692; 428/900; 427/127; 148/306; 355/296; 360/266.8
(58) Field of Search .......... 428/692, 656, 428/693, 665, 64.2, 65.2, 900, 660, 694 R, 694 TM, 694 T, 332, 334, 611, 627, 651, 668, 681, 928, 694 SC, 694 DE, 694 RE, 694 MM, 694 EC, 694 TF, 694 B, 694 BA, 694 BM; 335/91, 153, 296, 302, 306, 284; 360/264.9, 266.8; 427/127, 131, 132, 128, 250, 255, 294, 130, 32; 148/300, 301, 306, 101, 302; 310/90.5

(56) References Cited

U.S. PATENT DOCUMENTS 5,000,796 A * 3/1991 Chatterjee .......... 148/101
5,030,512 A * 7/1991 Kato et al. .......... 428/900
5,506,558 A * 4/1996 Laube .......... 310/90.5
5,545,266 A * 8/1996 Hirosawa et al. .......... 148/302
5,676,998 A * 10/1997 Araki et al. .......... 427/132
5,849,422 A * 12/1998 Hayashi .......... 428/611
6,080,498 A * 6/2000 Kikui et al. .......... 428/681
6,139,907 A * 10/2000 Sellmyer et al. .......... 428/694 TM
6,302,972 B1 * 10/2001 Hirosawa et al. .......... 148/302
6,387,548 B1 * 5/2002 Hasegawa et al. .......... 428/692

FOREIGN PATENT DOCUMENTS

| JP | 03-285307 | 12/1991 |
| JP | 06-151226 | 5/1994 |
| JP | 07-006916 | 1/1995 |
| JP | 08-235540 | 9/1996 |
| JP | 09-219313 | 8/1997 |
| JP | 10-270775 | 10/1998 |

OTHER PUBLICATIONS

American Heritage Dictionary definition of "ferromagnetic" Third Edition 1992 by Houghton Mifflin Company (Electronic Version).*

* cited by examiner

Primary Examiner—Stevan A. Resan
Assistant Examiner—Louis Falasco
(74) Attorney, Agent, or Firm—Nixon Peabody LLP; Jeffrey L. Costellia

(57) ABSTRACT

Refractory metal layers 2, 4, 6, 8, and 10, and rare earth alloy magnetic layers 3, 5, 7, 9, 11, and 12 are alternately deposited, so as to form a multilayer structure including four or more layers on a substrate. The refractory metal layers 2, 4, 6, 8, and 10 are formed from at least one kind of material selected from a group consisting of Ti, V, Cr, Zr, Nb, Mo, Hf, Ta, and W, and each has a thickness of not less than 5 nm nor more than 50 nm. The rare earth alloy magnetic layers 3, 5, 7, 9, 11, and 12 have tetragonal $R_2Fe_{14}B$ (R is Nd and/or Pr) as a primary constituent phase, and each has a thickness of not less than 50 nm nor more than 500 nm.

15 Claims, 3 Drawing Sheets

THIN PERMANENT-MAGNET FILM AND PROCESS FOR PRODUCING THE SAME

TECHNICAL FIELD

The present invention relates to a thin film permanent magnet and a method for producing the thin film. Particularly, the present invention relates to a thin film permanent magnet suitably used for a micro-motor, a micro-actuator, a device for applying a biased magnetic field to a magneto-resistive device, a magnetic recording medium, or the like.

BACKGROUND ART

In the progress of miniaturization of various types of electrical apparatuses, the development of a micro-motor, a micro-actuator, and the like in which a thin film permanent magnet is employed is pursued. The size and the performance of a device of such a type depend on the magnetic properties of a thin film permanent magnet. For this reason, attention is focused, as a candidate material for the thin film permanent magnet on a Nd—Fe—B based magnet material and a Sm—Co based magnet material of which the maximum magnetic energy product is high, and the research and development on such materials are being extensively conducted. Among them, a special attention is focused on a tetragonal $Nd_2Fe_{14}B$ compound constituting a main phase of the Nd—Fe—B based magnet material as a high-performance thin film permanent magnet, because the saturation magnetization thereof is higher than the saturation magnetization of $SmCo_5$ or $Sm_2CO_{17}$.

In the case of bulk-like permanent magnets, however, a Nd—Fe—B based magnet of which the maximum energy product exceeds 400 $kJ/m^3$ is manufactured, and commercially available. On the other hand, for a thin film permanent magnet primarily including the tetragonal $Nd_2Fe_{14}B$ compound, it is difficult to improve both of the magnetization and the coercive force simultaneously, so that the thin film permanent magnet has not been put into practical use yet.

In the case of the thin film permanent magnet, one of the reasons which make the improvement of both of the magnetization and the coercive force difficult is that the magnetic anisotropy of the Nd—Fe—B based magnet formed by thin film deposition technique is lower than that of a bulk-like permanent magnet manufactured by a method such as powder metallurgy, or other means.

In the case of the powder metallurgy, when a compact of magnetic powder is manufactured, highly anisotropic magnetic materials can be made by executing the orientation of magnetic powder in a magnetic field or by utilizing slide deformation.

As for the thin film deposition technique, an exemplary production of a perpendicularly magnetized film utilizing the anisotropic crystal growth is disclosed in F. J. Cadieu, et al, IEEE Trans. Magn. 22(1986) p.752, or the like, for example. It is considered, however, that the degree of technical perfection does not reach the level of the technology used for making anisotropic magnetic materials in the powder metallurgy.

As disclosed in K. D: Ayelsworth et al., Journal of Magnetism and Magnetic Materials 82(1989) p.48, an unintended impurity phase such as rare earth metal oxide or the like is often mixed or generated in a thin film having the tetragonal $R_2Fe_{14}B$ compound as a main phase. This is one of the factors preventing the properties of a thin film permanent magnet from being improved.

Various trials have been performed for the purposes of improving the properties of a thin film permanent magnet. For example, Japanese Laid-Open Patent Publication No.7-6916 discloses a thin film permanent magnet in which a protection film is disposed on a rare earth alloy magnetic thin film. Japanese Laid-Open patent Publication No.9-219313 discloses a thin film permanent magnet in which protection films are disposed on and under a rare earth alloy magnetic thin film.

These protection films prevent the reaction between the rare earth alloy magnetic thin film and the air or a substrate, and exercise a function of preventing the magnetic properties of the rare earth alloy magnetic thin film from being deteriorated due to the reaction.

However, the objects of the above-mentioned prior arts are to suppress the reaction caused by the direct contact between the rare earth alloy magnetic film and the substrate or the air and to prevent the alteration of the magnetic film caused by the reaction. Thus, the metallurgical microstructure of the rare earth alloy magnetic film is not sufficiently controlled. Therefore, the coercive force is lower than a value expected from a crystal magnetic anisotropic energy originally included in the tetragonal $R_2Fe_{14}B$ compound, and a sufficient residual magnetic flux density is not obtained.

In order to practically use the thin film permanent magnet, it is necessary to increase the energy product from the current value. For this purpose, it is necessary to control the metallurgical microstructure of the deposited rare earth alloy magnetic layer and further improve the magnetic anisotropy.

The present invention has been conducted in view of the above-described prior art. It is an object of the present invention to provide a high-performance thin film permanent magnet having both of high coercive force and high residual magnetic flux density by controlling the metallurgical microstructure. It is another object of the present invention to provide a rotating machine and a magnetic recording medium using such a thin film permanent magnet.

DISCLOSURE OF INVENTION

The thin film permanent magnet of the present invention is a thin film permanent magnet having a multilayer structure including four or more layers in which a refractory metal layer and a rare earth alloy magnetic layer are alternately deposited, and characterized in that the refractory metal layer is formed from at least one kind of material selected from a group consisting of Ti, V, Cr, Zr, Nb, Mo, Hf, Ta, and W, and has a thickness of not less than 5 nm nor more than 50 nm, and the rare earth alloy magnetic layer has tetragonal $R_2Fe_{14}B$ as a primary constituent phase (R is Nd and/or Pr), and has a thickness of not less than 50 nm nor more than 500 nm.

In a preferred embodiment, the rare earth alloy magnetic layer has magnetic anisotropy.

Preferably, a ratio $(B_{r2}/B_{r1})$ of a residual magnetic flux density $(B_{r2})$ in a direction perpendicular to an in-plane direction to a residual magnetic flux density $(B_{r1})$ in the in-plane direction of the rare earth alloy magnetic layer is 2 or more.

Preferably, the number of the rare earth alloy magnetic layers included in the multilayer structure is 3 or more.

Preferably, a ratio $(t_n/t_m)$ of a total thickness $(t_n)$ of the refractory metal layers to a total thickness $(t_m)$ of the rare earth alloy magnetic layers included in the multilayer structure satisfies a condition of $0.01 \leq (t_r/t_m) \leq 0.3$.

In a preferred embodiment, a buffer layer is formed between a substrate for supporting the multilayer structure and the multilayer structure.

In a preferred embodiment, the buffer layer is formed from at least one kind of material selected from a group consisting of Ti, V, Cr, Zr, Nb, Mo, Hf, Ta, and W.

In a preferred embodiment, a protection layer is formed as an uppermost layer of the multilayer structure.

The protection layer may be formed from at least one kind of material selected from a group consisting of Ti, V, Cr, Zr, Nb, Mo, Hf, Ta, and W.

The method for producing a thin film permanent magnet of the present invention includes the steps of: preparing a substrate formed from a material having a melting point of 300° C. or more; and forming, on the substrate, a multilayer structure including four or more layers in which a refractory metal layer having a thickness of not less than 5 nm nor more than 50 nm formed from at least one kind of material selected from a group consisting of Ti, V, Cr, Zr, Nb, Mo, Hf, Ta, and W and a rare earth alloy magnetic layer having a thickness of not less than 50 nm nor more than 500 nm and having tetragonal $R_2Fe_{14}B$ (R is Nd and/or Pr) as a primary constituent phase are alternately deposited.

In a preferred embodiment, in the step of forming the multilayer structure on the substrate, the rare earth alloy magnetic layer is formed while a temperature of the substrate is adjusted to be in the range of not less than 300° C. nor more than 800° C.

In the step of forming the multilayer structure on the substrate, the rare earth alloy magnetic layer may be formed while a temperature of the substrate is adjusted to be lower than 300° C., and after the multilayer structure is formed on the substrate, the multilayer structure may be heated to temperatures of not less than 400° C. nor more than 800° C.

A preferred embodiment includes a step of applying a magnetic field to the multilayer structure during or after the formation of the multilayer structure.

A rotating machine according to the present invention is characterized by including any one of the above-mentioned thin film permanent magnets.

A magnetic recording medium according to the present invention is characterized by including any one of the above-mentioned thin films of permanent magnet.

BEST MODE FOR CARRYING OUT THE INVENTION

The inventor of the present invention examined permanent magnetic properties for various films in which a R—Fe—B based alloy layer including tetragonal $R_2Fe_{14}B$ compound (R is Nd and/or Pr) as a main phase and a refractory metal layer were alternately deposited. As a result, the inventor found that the metallurgical microstructure of the R—Fe—B based alloy layer was strongly affected by the kinds of the refractory metal layers disposed on and under the R—Fe—B based alloy layer and the thickness of the R—Fe—B based alloy layer, and conceived the present invention.

The thin film permanent magnet according to the present invention is a permanent magnet film including a multilayer structure of four or more layers in which a refractory metal layer and a rare earth alloy magnetic layer are alternately deposited. The refractory metal layer is formed from at least one kind of material selected from a group consisting of Ti, V, Cr, Zr, Nb, Mo, Hf, Ta, and W, and has a thickness of not less than 5 nm nor more than 50 nm. The rare earth alloy magnetic layer includes tetragonal $R_2Fe_{14}B$ as a primary constituent phase and has a thickness of not less than 50 nm nor more than 500 nm. Herein, R includes Nd, Pr, or both of Nd and Pr. Co or a transition metal element such as Ni may be substituted for part of Fe.

By adopting the above-mentioned multilayer structure, the inventor found that a permanent magnet even in the shape of a thin film in which intensive perpendicular magnetic anisotropy and high coercive force were both achieved could be manufactured.

Figure 1:
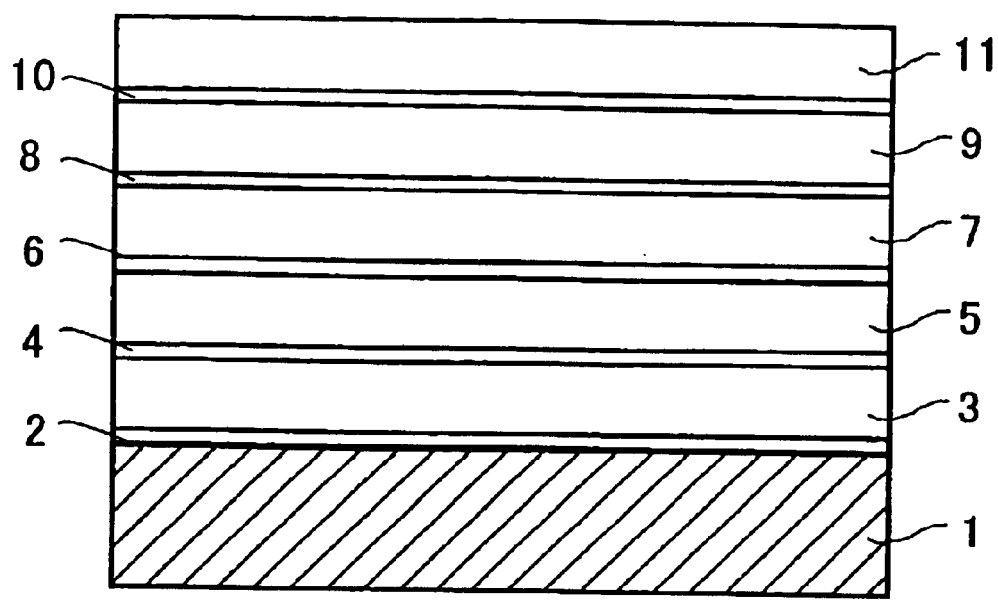
FIG. 1 is a cross-sectional view illustrating a thin film permanent magnet in an embodiment of the present invention.

Hereinafter a preferred embodiment of the thin film permanent magnet of the present invention will be described in detail with reference to FIG. 1. FIG. 1 illustrates a cross-sectional configuration of the thin film permanent magnet in this embodiment.

A thin film permanent magnet shown in FIG. 1 has a multilayer structure of 10 layers in which refractory metal layers 2, 4, 6, 8, and 10 and rare earth alloy magnetic layers 3, 5, 7, 9, and 11 are alternately deposited. The multilayer structure is disposed on a substrate 1.

The refractory metal layers 2, 4, 6, 8, and 10 are formed from at least one kind of material selected from a group consisting of Ti, V, Cr, Zr, Nb, Mo, Hf, Ta and W, and each has a thickness of not less than 5 nm nor more than 50 nm.

A primary constituent phase of the rare earth alloy magnetic layers 3, 5, 7, 9, and 11 is tetragonal $R_2Fe_{14}B$ (R is Nd and/or Pr), and the thickness thereof is adjusted to be not less than 50 nm nor more than 500 nm. In this permanent magnet, a tetragonal $R_2Fe_{14}B$ compound which is a hard magnetic phase mainly affects magnetic properties. When a thin film permanent magnet having high coercive force is required, a most preferable thickness of each of the rare earth alloy magnetic layers is not less than 50 nm nor more than 200 nm. It is preferred that the number of the rare earth alloy magnetic layers in the multilayer structure be 3 or more.

In the above-mentioned multilayer structure, between two rare earth alloy magnetic layers which are vertically stacked (the magnetic layer 3 and the magnetic layer 5, for example), a thin refractory metal layer (the refractory metal layer 4) is always disposed. In this embodiment, between the substrate 1 and the rare earth alloy magnetic layer 3 which is positioned as the lowermost layer, the refractory metal layer 2 exists. The refractory metal layer 2 may be omitted. In the example shown in FIG. 1, a refractory metal layer is not formed on the rare earth alloy magnetic layer 11 which is positioned as the uppermost layer. Alternatively, another refractory metal layer may be disposed on the rare earth alloy magnetic layer 11.

In terms of the improvement in magnetic anisotropy of rare earth alloy magnetic layers, the material of refractory metal layers should not be arbitrarily selected, but it is necessary that the refractory metal layers are formed from at least one kind of material selected from a group consisting of Ti, V, Cr, Zr, Nb, Mo, Hf, Ta, and W. The $R_2Fe_{14}B$ compound in the rare earth alloy magnetic layer has a tendency that if the compound is in contact with a refractory metal layer formed from the above-mentioned material during a deposition step or an annealing step (heat treatment step), the axis of easy magnetization thereof is oriented in a direction perpendicular to a face of the substrate. In other words, the above-mentioned refractory metal layer has functions of increasing the magnetic anisotropy of the rare earth alloy magnetic layer and of improving the residual magnetic flux density $B_r$ perpendicular to a plane.

Figure 2:
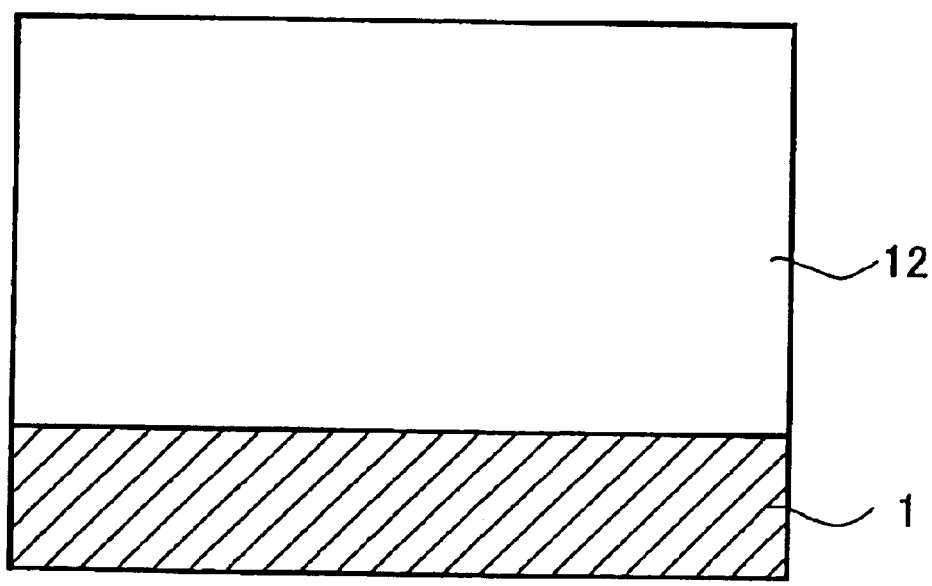
FIG. 2 is a cross-sectional view illustrating a conventional thin film permanent magnet.

In addition, these refractory metal layers 4, 6, 8, and 10 separate the rare earth alloy in the thin film permanent magnet in a direction of film thickness, so as to suppress the crystal growth of the tetragonal $R_2Fe_{14}B$ compound. As a result, in each of the rare earth alloy magnetic layers 3, 5, 7, 9, and 11, fine metallurgical microstructure is formed, and the coercive force is improved. FIG. 2 shows a cross-sectional configuration of a prior-art thin film permanent magnet in which a single rare earth alloy layer 12 is formed on a substrate 1. As is seen from FIGS. 1 and 2, the total thickness of the rare earth alloy magnetic layers 3, 5, 7, 9, and 11 in this embodiment is substantially equal to the thickness of the rare earth alloy magnetic layer 12 in FIG. 2. The respective rare earth alloy magnetic layers 3, 5, 7, 9, and 11 in FIG. 1 are separated by the provision of the refractory metal layers 4, 6, 8, and 10. As a result, in the rare earth alloy magnetic layers 3, 5, 7, 9, and 11, the crystal growth of the tetragonal $R_2Fe_{14}B$ compound is suppressed, and the metallurgical structure is sufficiently fined. This significantly contributes to the increase in coercive force.

It was found that if the thickness of each of the refractory metal layers 2, 4, 6, 8, and 10 was lower than 5 nm, the above-mentioned crystal orientation effect could not be sufficiently exhibited. In addition, it was found that if the thickness of each of the refractory metal layers 2, 4, 6, 8, and 10 exceeded 50 nm, nonmagnetic refractory atoms were largely penetrated into the rare earth alloy magnetic layers, and the crystal magnetic anisotropic energy of the magnetic layers was disadvantageously decreased.

If the refractory metal layers 4, 6, 8, and 10 sandwiched by the upper and lower rare earth alloy magnetic layers are too thick, the magnetic coupling between the two upper and lower rare earth alloy magnetic layers become weak. This is not preferable. The problem in the magnetic coupling is insignificant in the cases where the refractory metal layer is positioned as the lowermost layer or positioned as the uppermost layer of the multilayer structure. The refractory metal layer in such a position exerts a significant function as a protection layer, so that it may have a thickness in excess of 500 nm.

If a ratio of the thickness of the refractory metal layers to the thickness of the rare earth alloy magnetic layers is too large, the magnetization of the whole film of the stacked layers lowers. This is not preferable because Ti, V, Cr, Zr, Nb, Mo, Hf, Ta, and W are not ferromagnetic. Accordingly, it is preferred that the ratio $(t_n/t_m)$ of the total thickness $(t_n)$ of the refractory metal layers 2, 4, 6, 8, and 10 to the total thickness $(t_m)$ of the rare earth alloy magnetic layers 3, 5, 7, 9, and 11 constituting one thin film permanent magnet satisfy a condition of $0.01 \leq (t_n/t_m) \leq 0.3$.

In ternary phase diagram of the R—Fe—B based alloy, existence of a lot of thermal equilibrium phases and metastable phases is known. In the thin film permanent magnet of the present invention, the R—Fe—B alloy layer is primarily composed of tetragonal $R_2Fe_{14}B$ compound. Among compounds known as R—Fe—B alloy ternary system, the tetragonal $R_2Fe_{14}B$ compound has the largest crystal magnetic anisotropic energy, and hence realizes high coercive force. Accordingly, it is desirable that a fraction of the $R_2Fe_{14}B$ compound in the rare earth alloy magnetic layer be as large as possible.

It is known that the coercive force depends on the metallurgical microstructure and the crystal grain diameter of the $R_2Fe_{14}B$ compound. In order to improve the coercive force, it is desirable that magnetic domain walls be prevented from moving by fining the crystals. In the thin film permanent magnet according to the present invention, as described above, the rare earth alloy magnetic layers are separated by the refractory metal layers in the film thickness direction, so that the crystal growth of tetragonal $R_2Fe_{14}B$ is limited by the thickness of each of the magnetic layers. Therefore, by adjusting the rare earth alloy magnetic layers, the crystal grain diameter of the $R_2Fe_{14}B$ compound can be optimized, and the coercive force can be increased.

As described above, if the rare earth alloy magnetic layer is too thick, the crystal grains of tetragonal $R_2Fe_{14}B$ becomes coarse, and hence the coercive force is lowered. In addition, the orientation of the crystal growth is disturbed, so that the magnetization is lowered. Accordingly, the thickness of each rare earth alloy magnetic layer is preferably set to be 500 nm or less. On the other hand, if the thickness of each rare earth alloy magnetic layer is too thin, the existence ratio of the nonmagnetic layer occupying in the whole of the multilayer structure tends to be high. Thus, the average magnetization of the whole of the multilayer structure is lowered. This is not preferable. It is preferred that the thickness of each rare earth alloy magnetic layer be set to be 50 nm or more.

Hereinafter an embodiment of a method for producing a thin film permanent magnet according to the present invention will be described.

A substrate formed from a material having a melting point of 300° C. or more is prepared. The substrate is subjected to annealing at 300° C. or more during the formation of a multilayer structure or after the formation. Accordingly, the material for the substrate is required to have a melting point of 300° C. or more and to withstand the above-mentioned annealing. In addition, it is preferred that the substrate be formed from a material which is chemically stable and resistant to reaction with an atmospheric gas or a deposited material during the deposition of the thin film or during a heating process. As such a substrate, a Si wafer, a Mo plate, stainless, various kinds of steel plates, a sapphire plate, a quartz plate, a glass plate, an $Al_2O_3$—TiC complex ceramics plate, and the like can be suitably used.

Even in the case where the material of the substrate easily reacts with a rare earth alloy magnetic layer, if a buffer layer for suppressing such reaction covers an upper face of the substrate, there arises no problem. As such a buffer layer, a refractory metal layer formed from at least one kind of material selected from a group consisting of Ti, V, Cr, Zr, Nb, Mo, Hf, Ta, and W may be used, or another stable film may be used. The thickness of the buffer layer is not limited to be 50 nm or less.

In the present invention, a structure in which a refractory metal layer and a rare earth alloy magnetic layer are alternately deposited is formed on a substrate by using a thin film deposition technique such as sputtering. Either a method in which a temperature of the substrate is adjusted in the range of not less than 300° C. nor more than 800° C. in a process for forming the multilayer structure on the substrate, or a method in which the temperature of the substrate is adjusted to be lower than 300° C. in a process for forming the multilayer structure on the substrate, and the annealing at temperatures of not less than 400° C. nor more than 800° C. is performed after the multilayer structure is formed on the substrate may be adopted.

A method for heating the substrate in the formation of the multilayer structure is arbitrarily selected. For example, the substrate may be directly or indirectly heated by a sheathed heater or an infrared lamp heater. The heating process performed after the formation of the multilayer structure is desired to be executed in vacuum or an inert gas atmosphere so as not to oxidize the thin film permanent magnet. The period of time for the heating process varies depending on the annealing temperatures. For example, when the annealing temperature is 600° C., it is preferred that a heating process for about 0.2 to 2 hours be performed.

A rare earth metal or an alloy including a rare earth metal which constitutes the rare earth alloy magnetic layer is easily oxidized, so that the deposition process is desirably conducted in a high vacuum atmosphere or an inert gas atmosphere. In addition to sputtering, vacuum evaporation and laser ablation are listed as preferable thin film deposition methods. Chemical, physical, and metallographic properties of the deposited layers by these methods depend on various conditions in the deposition process. Since the R—Fe—B alloy easily becomes amorphous, it is necessary to control the substrate temperature in the deposition process so as to be in the above-mentioned range, or to crystallize the alloy by a heating process after the deposition process.

In the case where the thin film permanent magnet of the present invention is applied to a rotating machine or the like, a material which is chemically stable and is suitable as a yoke member, for example, a silicon steel plate, a permalloy plate, or the like is desirably used for the substrate material.

In the case where the thin film permanent magnet of the present invention is applied to a magnetic recording medium, a protection film formed by a diamond-like carbon is desirably disposed on the thin film permanent magnet. In the case where the recording medium is used as a perpendicular magnetic recording medium, a backing layer of Ni—P, a permalloy film, or the like is desirably disposed between the thin film permanent magnet and the substrate.

EMBODIMENTS

Hereinafter embodiments of the present invention will be described.

Embodiment 1

In this embodiment, first, on an $Al_2O_3$—TiC ceramic substrate which was heated at 550° C., a plurality of samples in which refractory metal layers consisting of one kind of Ta, Mb, Zr, and Ti layers and Nd—Fe—B alloy layers (rare earth alloy magnetic layers) were alternately deposited were prepared by a DC diode magnetron sputtering apparatus. In this embodiment, for all of the samples, the total thickness of the Nd—Fe—B alloy layers was set to be 1000 nm (200 nm×5). The multilayer structure and the magnetic properties in the respective samples are shown in the following Table 1.

TABLE 1

| Sample No. | Multilayer Structure | In-plane Br1 (T) | In-plane $H_{cJ}$ (kA/m) | Perpendicular to the film plan Br2 (T) | Perpendicular to the film plan $H_{cJ}$ (kA/m) |
| --- | --- | --- | --- | --- | --- |
| 1 Comparative example | Sub./Nd—Fe—B (1000 nm) | 0.20 | 263 | 0.61 | 509 |
| 2 Example of the invention | Sub./[Ti (20 nm)/Nd—Fe—B (200 nm)] × 5 | 0.25 | 422 | 0.89 | 844 |
| 3 Example of the invention | Sub./[Ta (20 nm)/Nd—Fe—B (200 nm)] × 5 | 0.11 | 422 | 0.88 | >1194 |
| 4 Example of the invention | Sub./[Zr (20 nm)/Nd—Fe—B (200 nm)] × 5 | 0.13 | 382 | 0.83 | 700 |
| 5 Example of the invention | Sub./[Nb (20 nm)/Nd—Fe—B (200 nm)] × 5 | 0.08 | 287 | 0.81 | 828 |
| 6 Example of the invention | Sub./[Ta (5 nm)/Nd—Fe—B (200 nm)] × 5 | 0.15 | 247 | 0.86 | 939 |
| 7 Example of the invention | Sub./[Ta (10 nm)/Nd—Fe—B (200 nm)] × 5 | 0.16 | 247 | 0.81 | >1194 |
| 8 Example of the invention | Sub./[Ta (50 nm)/Nd—Fe—B (200 nm)] × 5 | 0.26 | 517 | 0.89 | 812 |
| 9 Comparative example | Sub./[Ta (3 nm)/Nd—Fe—B(200 nm)] × 5 | 0.16 | 247 | 0.73 | 732 |
| 10 Comparative example | Sub./[Ta (100 nm)/Nd—Fe—B (200 nm)] × 5 | 0.24 | 509 | 0.76 | 708 |
| 11 Comparative example | Sub./Ta (50 nm)/Nd—Fe—B (1000 nm) | 0.24 | 342 | 0.72 | 700 |
| 12 Comparative example | Sub./Ta (50 nm)/Nd—Fe—B (1000 nm)/Ta (50 nm) | 0.26 | 446 | 0.75 | 708 |
| 13 Comparative example | Sub./Nd—Fe—B (1000 nm)/Ta (50 nm) | 0.21 | 271 | 0.62 | 867 |

In the table, Samples Nos. 2 to 8 are examples of the present invention, and Samples Nos. 1 and 9 to 13 are comparative examples.

For the deposition of the Ta, Mb, Zr, or Ti layer, pure metal target was used. The deposition was performed in conditions of throw-in power of 3 to 6 W/cm$^2$, Ar pressure of 0.5 Pa, and deposition rate of 0.1 to 0.8 nm/s. For the deposition of the Nd—Fe—B alloy layer, cast alloy having a composition of $Nd_{14}Fe_{71}B_{15}$ in atom ratio was used as a target. The deposition was performed in conditions of throw-in power of 10 W/cm$^2$, Ar pressure of 0.5 Pa, and deposition rate of 3 nm/s.

After the samples were cooled in a chamber of the sputtering apparatus, the samples were taken out. The magnetization curves in a film in-plane direction and in a direction perpendicular to the film plane were measured by a sample vibrating magnetometer. Based on the data, characteristic values were calculated on the assumption that only the Nd—Fe—B alloy layers were uniformly magnetized. The residual magnetic flux density $B_r$ and the coercive force $H_{cJ}$ obtained by the calculation are shown in Table 1.

The representation of "Substrate/[Ti(20 nm)/Nd—Fd—B (200 nm)]×5" shown in a box of "Multilayer Structure" in Table 1 means that "a structure in which a Ti layer having a thickness of 20 nm and an Nd—Fe—B alloy layer having a thickness of 200 nm are alternately deposited is formed on a substrate, and the numbers of layers of the Ti layers and the Nd—Fe—B alloy layers included in the deposited structure are 5, respectively".

As is seen from Table 1, the coercive forces $H_{cJ}$ of all of the examples are larger than the coercive force $H_{cJ}$ of the comparative example (Sample No. 1) in which only a single layer of Nd—Fe—B alloy layer is formed. In the examples, the residual magnetic flux densities $B_{r2}$ in the direction perpendicular to the film plane are higher than the residual magnetic flux densities $B_{r1}$ in the film in-plane direction, and hence a so-called perpendicular magnetic anisotropy is exhibited. Especially in the cases of Samples Nos. 3 to 7, a ratio ($B_{r2}/B_{r1}$) of the residual magnetic flux density $B_{r2}$ in the direction perpendicular to the film plane to the residual magnetic flux density $B_{r1}$ in the film in-plane direction is a high value, i.e., 5 or more.

Figure 3:
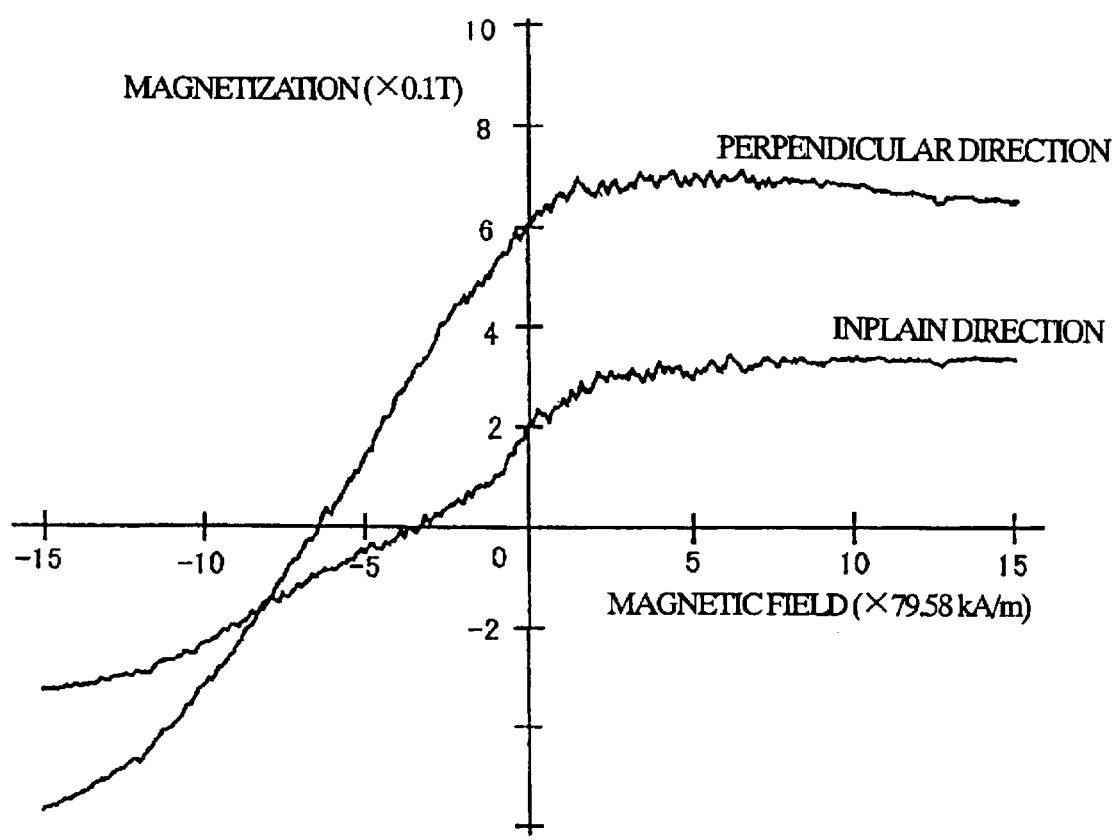
FIG. 3 is a graph showing a magnetization curve of a comparative example of Sample No.1 in Table 1. In the figure, the axis of abscissa represents the magnitude of an external magnetic field, and the axis of ordinate represents magnetization intensity.
Figure 4:
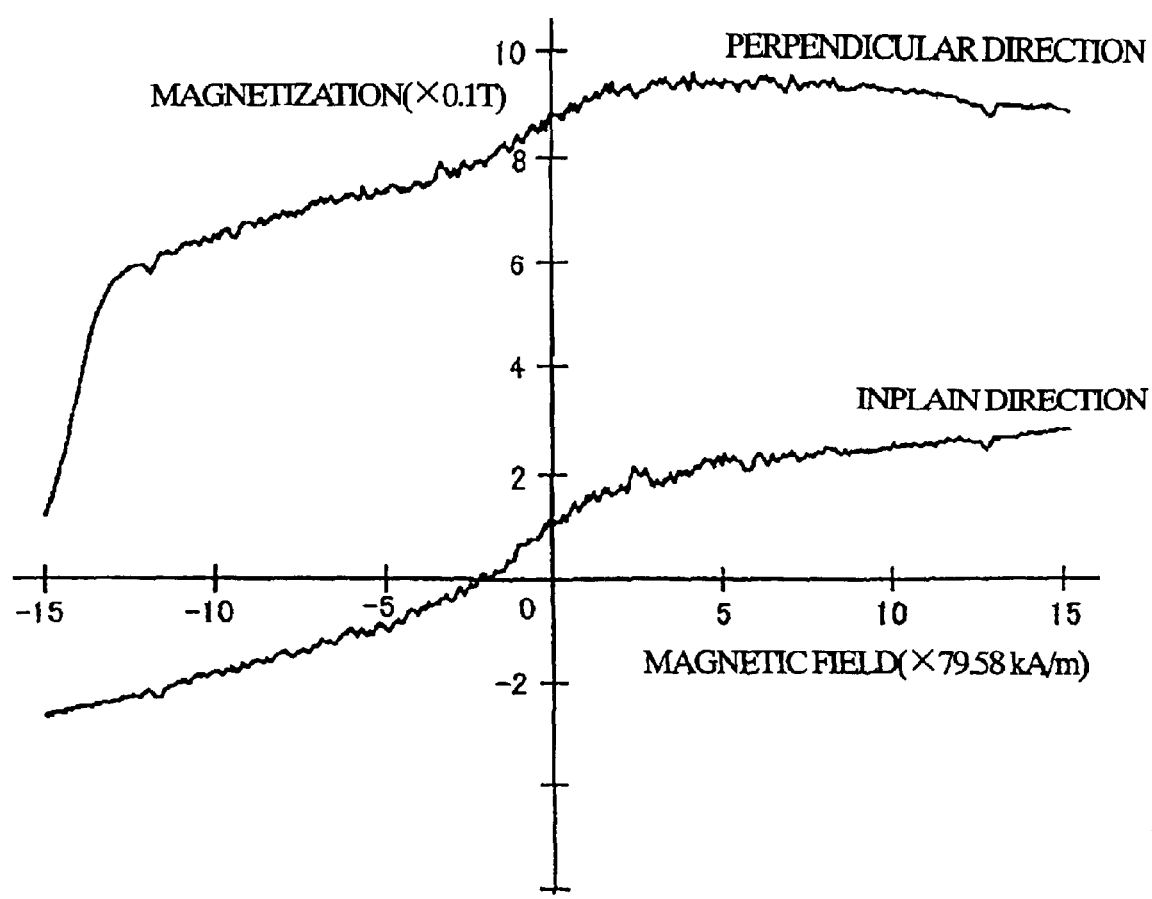
FIG. 4 is a graph showing a magnetization curve of an example of Sample No.3 in Table 1. In the figure, the axis of abscissa represents the magnitude of an external magnetic field, and the axis of ordinate represents magnetization intensity.

The magnetization curve of the comparative example for Sample No. 1 is shown in FIG. 3, and the magnetization curve of the example for Sample No. 3 is shown in FIG. 4. As apparent from the comparison between these magnetization curves, the residual magnetic flux density $B_{r2}$ in the perpendicular direction in the embodiment is remarkably higher than the residual magnetic flux density $B_{r2}$ in the perpendicular direction in the single layer of Nd—Fe—B alloy layer, and it is found that the perpendicular magnetic anisotropy is improved.

Embodiment 2

In this embodiment, on an $Al_2O_3$—TiC ceramic substrate heated at 550° C., a sample in which five Ta layers each having a thickness of 20 nm and five Pr—Fe—B alloy layers each having a thickness of 200 nm were alternately deposited, and a sample in which only a Pr—Fe—B alloy layer having a thickness of 1000 nm was formed by a DC diode magnetron sputtering apparatus were prepared. For respective samples, the multilayer structures and the magnetic properties are shown in the following Table 2.

in power of 6 W/cm$^2$, Ar pressure of 0.5 Pa, and deposition rate of 0.8 nm/s. For the deposition of the Pr—Fe—B alloy layer, cast alloy having a composition of $Pr_{14}Fe_{72}B_{14}$ in atom ratio was used as a target. The deposition was performed in conditions of throw-in power of 10 W/cm$^2$, Ar pressure of 0.5 Pa, and deposition rate of 3 nm/s.

After the samples were cooled in a chamber of the sputtering apparatus, the samples were taken out. The magnetization curves in a film in-plane direction and in a direction perpendicular to the film plane were measured by a sample vibration type magnetometer. Based on the data, characteristic values were calculated on the assumption that only the Pr—Fe—B alloy layer was uniformly magnetized. The residual magnetic flux density and the coercive force obtained by the calculation are shown in Table 2.

As is seen from Table 2, the coercive forces $H_{cJ}$ of the example is larger than the coercive force $H_{cJ}$ of the comparative example (Sample No. 14) in which only a single layer of Pr—Fe—B alloy layer is formed. In the embodiment, the residual magnetic flux density $B_{r2}$ in a direction perpendicular to the film plane is extremely higher than the residual magnetic flux density $B_{r1}$ in the film in-plane direction, and hence perpendicular magnetic anisotropy is exhibited.

Embodiment 3

In this embodiment, on an $Al_2O_3$—TiC ceramic substrate cooled by water, a sample in which five Ta layers each having a thickness of 20 nm and five Nd—Fe—B alloy layers each having a thickness of 200 nm were alternately deposited, and a sample in which only an Nd—Fe—B alloy

TABLE 2

| | | In-plane | | Perpendicular to the film plan | |
|---|---|---|---|---|---|
| Sample No. | Multilayer Structure | Br1 (T) | $H_{cJ}$ (kA/m) | Br2 (T) | $H_{cJ}$ (kA/m) |
| 14 Comparative example | Sub./Pr—Fe—B (1000 nm) | 0.21 | 231 | 0.65 | 485 |
| 15 Example of the invention | Sub./[Ta (20 nm)/Pr—Fe—B (200 nm)] × 5 | 0.16 | 478 | 0.83 | >1194 |

In the table, Sample No. 15 is an example of the present invention and Sample No. 14 is a comparative example.

For the deposition of the Ta layer, pure metal target was used. The deposition was performed in conditions of throwlayer having a thickness of 1000 nm was formed, by a DC diode sputtering method were prepared. For respective samples, the multilayer structures and the annealing conditions are shown in the following Table 3.

TABLE 3

| | | In-plane | | Perpendicular to the film plan | |
|---|---|---|---|---|---|
| Sample No. | Multilayer Structure | Br1 (T) | $H_{cJ}$ (kA/m) | Br2 (T) | $H_{cJ}$ (kA/m) |
| 14 Comparative example | Sub./Pr—Fe—B (1000 nm) | 0.21 | 231 | 0.65 | 485 |
| 15 Example of the invention | Sub./[Ta (20 nm)/Pr—Fe—B (200 nm)] × 5 | 0.16 | 478 | 0.83 | >1194 |

In the table, Sample No. 17 is an example of the present invention and Sample No. 16 is a comparative example.

For the deposition of the Ta layer, pure metal target was used. The deposition was performed in conditions of incident power of 6 W/cm², Ar pressure of 0.5 Pa, and deposition rate of 0.8 nm/s. For the deposition of the Nd—Fe—B alloy layer, cast alloy having a composition of $Nd_{14}Fe_{71}B_{15}$ in atom ratio was used as a target. The deposition was performed in conditions of throw-in power of 10 W/cm², Ar pressure of 0.5 Pa, and deposition rate of 3 nm/s.

For the samples, annealing was performed in vacuum at 600° C. for one hour. Thereafter, the magnetization curves in a film in-plane direction and in a direction perpendicular to the film plane were measured by a sample vibrating magnetometer. Based on the data, characteristic values were calculated on the assumption that only the Nd—Fe—B alloy layer was uniformly magnetized. The residual magnetic flux density, and the coercive force obtained by the calculation are shown in Table 4.

TABLE 4

| Sample No. | | In-plane | | Perpendicular to the film plane | |
|---|---|---|---|---|---|
| | | Br1 (T) | $H_{cJ}$ (kA/m) | Br2 (T) | $H_{cJ}$ (kA/m) |
| 16 | Comparative example | 0.20 | 167 | 0.76 | 342 |
| 17 | Example of the invention | 0.12 | 358 | 0.96 | 1019 |

As is seen from Table 4, the coercive forces $H_{cJ}$ of the example is significantly larger than the coercive force $H_{cJ}$ of the comparative example (Sample No. 16) in which only a single layer of Nd—Fe—B alloy layer is formed. In the embodiment, the residual magnetic flux density $B_{r2}$ in a direction perpendicular to the film plane is extremely higher than the residual magnetic flux density $B_{r1}$ in the film in-plane direction, and hence perpendicular magnetic anisotropy is exhibited.

As described above, the thin film permanent magnet of the present invention can exert high coercive force and perpendicular magnetic anisotropy.

When such a thin film permanent magnet of the present invention was incorporated in a rotating machine, and was caused to operate in rated condition, good performance could be obtained. In addition, the torque was measured. The torque was increased as compared with a prior-art film. On the other hand, when the thin film permanent magnet according to the present invention was used for a magnetic recording medium, high output and high S/N ratio were obtained.

Industrial Applicability

According to the present invention, crystal orientation of tetragonal $R_2Fe_{14}B$ compound is improved, and an isotropic magnet having high residual magnetic flux density in a direction perpendicular to a film plane can be realized. In addition, according to the present invention, the metallurgical microstructure of the tetragonal $R_2Fe_{14}B$ compound is made to be fine, so that the improvement in coercive force can be achieved.

What is claimed is:

1. A thin film permanent magnet having a multilayer structure including four or more layers in which a refractory metal layer and rare earth alloy magnetic layer are alternately deposited, wherein
   the refractory metal layer is formed from a material selected from a group consisting of Ti, V, Zr, Nb, Mo, Hf, Ta, W and combinations thereof, and has a thickness of not loss than 5 nm nor more than 50 nm, and
   the rare earth alloy magnetic layer has tetragonal $R_2Fe_{14}B$ as a primary constituent phase (R is Nd and/or Pr), and has a thickness of not less than 50 nm nor more than 500 nm.

2. The thin film permanent magnet of claim 1 wherein the rare earth alloy magnetic layer has magnetic anisotropy.

3. The thin film permanent magnet of claim 2, wherein a ratio $(B_{r2}/B_{r1})$ of a residual magnetic flux density $(B_{r2})$ in a direction perpendicular to an in-plane direction to a residual magnetic flux density $(B_{r1})$ in the in-plane direction of the rare earth alloy magnetic layer is 2 or more.

4. The thin film permanent magnet of anyone of claims 1 to 3, wherein the number of the rare earth alloy magnetic layers included in the multilayer structure is 3 or more.

5. The thin film permanent magnet of any one of claims 1 to 3, wherein a ratio $(t_n/t_m)$ of a total thickness $(t_n)$ of the refractory metal layers to a total thickness $(t_m)$ of the rare earth alloy magnetic layers included in the multilayer structure satisfies a condition of $0.01 \leq (t_n/t_m) \leq 0.3$.

6. The thin film permanent magnet of any one of claims 1 to 3, wherein a buffer layer is formed between a substrate for supporting the multilayer structure and the multilayer structure.

7. The thin film permanent magnet of claim 6, wherein the buffer layer is formed from at least one kind of material selected from a group consisting of Ti, V, Zr, Nb, Mo, Hf, Ta, and W.

8. The thin film permanent magnet of any one of claims 1 to 3, wherein a protection layer is formed as an uppermost layer of the multilayer structure.

9. The thin film permanent magnet of claim 8, wherein the protection layer is formed from at least one kind of material selected from a group consisting of Ti, V, Zr, Nb, Mo, Hf, Ta, and W.

10. A method for producing a thin film permanent magnet comprising the steps of:
    preparing a substrate formed from a material having a melting point of 300° C. or more; and
    forming, on the substrate, a multilayer structure including four or more layers in which a refractory metal layer having a thickness of not less than 5 nm nor more than 50 nm formed from a material selected from a group consisting of Ti, V, Zr, Nb, Mo, Hf, Ta, W and combinations thereof, and a rare earth alloy magnetic layer having a thickness of not less than 50 nm nor more than 500 nm and having tetragonal $R_2Fe_{14}B$ (R is Nd and/or Pr) as a primary constituent phase are alternately deposited.

11. The method for producing a thin film permanent magnet of claim 10, wherein, in the step of forming the multilayer structure on the substrate, the rare earth alloy magnetic layer is formed while a temperature of the substrate is adjusted to be in the range of not less than 300° C. nor more than 800° C.

12. The method for producing a thin film permanent magnet of claim 10, wherein, in the step of forming the multilayer structure on the substrate, the rare earth alloy magnetic layer is formed while a temperature of the substrate is adjusted to be lower than 300° C., and after the multilayer structure is formed on the substrate, the multilayer structure is heated to temperatures of not less than 400° C. nor more than 800° C.

13. The method for producing a thin film permanent magnet of any one of claims 10 to 12, further comprising a step of applying a magnetic field to the multilayer structure during or after the formation of the multilayer structure.

14. A rotating machine including a thin film permanent magnet according to any one of claims 1 to 3.

15. A magnetic recording medium including a thin film permanent magnet according to any one of claims 1 to 3.

* * * * *